(12) United States Patent
Cornic et al.

(10) Patent No.: US 10,852,391 B2
(45) Date of Patent: Dec. 1, 2020

(54) METHOD FOR JAMMING SYNTHETIC APERTURE RADARS AND ASSOCIATED DEVICE

(71) Applicant: THALES, Courbevoie (FR)

(72) Inventors: Pascal Cornic, Guilers (FR); Jean-Michel Quellec, Ploumoguer (FR); Patrick Legros, Brest (FR)

(73) Assignee: THALES, Courbevoie (FR)

( * ) Notice: Subject to any disclaimer, the term of this patent is extended or adjusted under 35 U.S.C. 154(b) by 351 days.

(21) Appl. No.: 16/074,688

(22) PCT Filed: Jan. 30, 2017

(86) PCT No.: PCT/EP2017/051896
§ 371 (c)(1),
(2) Date: Aug. 1, 2018

(87) PCT Pub. No.: WO2017/133998
PCT Pub. Date: Aug. 10, 2017

(65) Prior Publication Data
US 2019/0033427 A1    Jan. 31, 2019

(30) Foreign Application Priority Data
Feb. 5, 2016    (FR) ...................................... 1600196

(51) Int. Cl.
*G01S 7/38* (2006.01)
*G01S 7/02* (2006.01)
(Continued)

(52) U.S. Cl.
CPC ................ *G01S 7/38* (2013.01); *F41H 11/02* (2013.01); *G01S 7/021* (2013.01); *G01S 19/015* (2013.01);
(Continued)

(58) Field of Classification Search
CPC ........... G01S 7/38; G01S 19/015; H04K 3/40; H04K 3/42; H04K 3/44
See application file for complete search history.

(56) References Cited

U.S. PATENT DOCUMENTS 4,103,236 A * 7/1978 Deserno .................... H04K 3/42
455/1
4,307,400 A * 12/1981 Miley ....................... G01S 7/38
342/14
(Continued)

FOREIGN PATENT DOCUMENTS

CN        103 760 532 A      4/2014

OTHER PUBLICATIONS

Zhao, et al., "Deception Jamming for Squint SAR Based on Multiple Receivers", IEEE Journal of Selected Topics in Applied Earth Observations and Remote Sensing, vol. 8, Issue: 8, pp. 3988-3998, Aug. 1, 2015.
(Continued)

*Primary Examiner* — Peter M Bythrow
(74) *Attorney, Agent, or Firm* — BakerHostetler (57) ABSTRACT

A method for jamming airborne SAR radar implemented by a jamming device includes at least two cooperating units surrounding an area on the ground to be protected, at least two units providing a radar-detection function and at least one unit providing a radar-jamming function, each unit being interlinked by a two-way data link and being synchronized by a common clock, the method comprises a step of identifying the signals received and whether the received signals correspond to SAR signals; a step of characterizing the received SAR signal over a short duration; a step of computing a filter adapted to the signal; a step of carrying out pulse compression of the signal; a step of iteratively periodically characterizing the signal over a long duration; a
(Continued)

step of computing the jamming signals to be transmitted; a step of transmitting the jamming signals.

14 Claims, 5 Drawing Sheets

(51) Int. Cl.
    *H04K 3/00*         (2006.01)
    *G01S 19/01*       (2010.01)
    *F41H 11/02*      (2006.01)

(52) U.S. Cl.
    CPC ............... *H04K 3/40* (2013.01); *H04K 3/42* (2013.01); *H04K 3/44* (2013.01)

(56) References Cited

U.S. PATENT DOCUMENTS

| | | | | | |
|---|---|---|---|---|---|
| 4,328,496 | A | * | 5/1982 | White | G01S 7/38 342/15 |
| 4,523,291 | A | * | 6/1985 | Giubbolini | G01S 7/38 702/77 |
| 4,743,905 | A | * | 5/1988 | Wiegand | G01S 7/38 342/14 |
| 5,430,445 | A | * | 7/1995 | Peregrim | F41G 7/343 342/25 C |
| 5,506,582 | A | * | 4/1996 | Lawsine | G01S 7/38 342/15 |
| 6,396,432 | B1 | * | 5/2002 | Riemschneider | H04K 3/90 342/15 |
| 6,476,755 | B1 | * | 11/2002 | Senio | G01S 7/38 342/15 |
| 6,624,780 | B1 | * | 9/2003 | Fouts | G01S 7/38 342/14 |
| 7,081,846 | B1 | * | 7/2006 | Sparrow | G01S 7/38 342/14 |
| 7,728,755 | B1 | * | 6/2010 | Jocic | H04K 3/45 342/20 |
| 8,830,112 | B1 | * | 9/2014 | Buehler | H04K 3/825 342/13 |
| 8,836,569 | B1 | * | 9/2014 | James | H01Q 15/14 342/3 |
| 9,846,223 | B1 | * | 12/2017 | Hellwig | G01S 7/021 |
| 2004/0201518 | A1 | * | 10/2004 | Pace | G01S 7/38 342/169 |
| 2005/0168375 | A1 | * | 8/2005 | Halladay | G01S 7/38 342/14 |
| 2008/0136701 | A1 | * | 6/2008 | Ferm | H04K 3/65 342/14 |
| 2009/0061759 | A1 | * | 3/2009 | Stoddard | H04K 3/41 455/1 |
| 2009/0278732 | A1 | * | 11/2009 | Antonik | G01S 13/9054 342/25 B |
| 2010/0302087 | A1 | * | 12/2010 | Low | H04K 3/42 342/14 |
| 2012/0327985 | A1 | * | 12/2012 | Norris | G01S 7/38 375/221 |
| 2014/0170963 | A1 | * | 6/2014 | Delaveau | H04K 3/28 455/1 |

OTHER PUBLICATIONS

Liu, et al., "An Efficient SAR Jammer with Direct Radio Frequency Processing (Drip)", Progress in Electromagnetics Research, vol. 137, pp. 293-309, Jan. 1, 2013 (Jan. 1, 2013), XP055312912.

Zhou, et al., "A Large Scene Deceptive Jamming Method for Space-Borne Sar ", IEEE Transactions on Geoscience and Remote Sensing (TGRS), vol. 51, Issue: 8, Aug. 1, 2013 (Aug. 1, 2013), pp. 4486-4495, XP011521744.

* cited by examiner

METHOD FOR JAMMING SYNTHETIC APERTURE RADARS AND ASSOCIATED DEVICE

CROSS-REFERENCE TO RELATED APPLICATIONS

This application is a National Stage of International patent application PCT/EP2017/051896, filed on Jan. 30, 2017, which claims priority to foreign French patent application No. FR 1600196, filed on Feb. 5, 2016, the disclosures of which are incorporated by reference in their entirety.

FIELD OF THE INVENTION

The present invention relates to the field of protecting sensitive civilian or military sites. The invention more particularly relates to a device and method for jamming synthetic aperture-type radars.

BACKGROUND

Given the very long integration time of synthetic aperture radars (SAR), typically several tens of seconds, these radars exhibit very high compression gain, which allows them to detect targets at very long distances, typically distances of greater than 100 km, and to do so with a high signal-to-noise ratio. The power needed to neutralize this type of threat using conventional jamming means is consequently very high, thereby making it very difficult to produce effective jammers.

One jamming means known from the prior art consists in transmitting noise, a continuous wave (CW) or a swept continuous wave in the reception band of the SAR radar to be jammed, for the purpose of masking a zone that is to be protected from observation. This type of jamming requires a very high power due to the compression gain of such a radar corresponding to several tens of decibels and because in general, the area to be protected is large, typically of the order of several km². The jamming in this case is non-coherent.

Another jamming means consists in retransmitting a delayed signal (with a frequency offset and/or a phase offset) repeating the signal transmitted by the SAR radar on each recurrence, for example using a digital radiofrequency memory (DRFM) system, and a series of replicas that are identical to this signal, distributed in a certain frequency band, so as to cover the Doppler analysis band of the SAR radar to be jammed. In this case too, the jamming power to be generated is very high, since even if the jamming signal is compressed by the SAR radar on the radial distance axis, the same is not true on the transverse distance axis. Furthermore, since the Doppler band covered by the SAR radar is unknown, it is necessary to provide a high jamming power on a frequency band higher than the SAR band. The jamming is then coherent in terms of distance but non-coherent in terms of Doppler.

Another jamming means known from the prior art consists in retransmitting a signal repeating the signal transmitted by the SAR radar on each recurrence, coherently, for example using a DRFM and a series of replicas that are identical to this signal, distributed in the band of the SAR radar and coherent from one recurrence to the next, these replicas reproducing the phase history of each pixel of the SAR image according to its geographical position. The jamming is then coherent on the distance axis and on the Doppler axis. This technique is such that it greatly limits the jamming power to be transmitted, but requires knowledge at each instant in time of the position of the SAR radar with respect to the set of points of the area to be protected. This knowledge is a priori never available, except in the particular case of observation satellites having regularly repeating orbits. Furthermore, the amount of computing needed to define and to generate the set of replicas in real time makes this solution impracticable.

SUMMARY OF THE INVENTION

One aim of the invention is in particular to overcome all or some of the drawbacks of the prior art by providing a solution making it possible to jam, coherently, a SAR radar attempting to image a zone to be protected and using only a modest amount of transmission power.

To this end, one subject of the invention is a method for jamming at least one SAR-type airborne radar implemented by a radar-jamming device comprising a group of at least two cooperating units surrounding an area on the ground to be protected, at least two units of said group providing a radar-detection function and at least one unit of said group providing a radar-jamming function, each unit providing the radar-detection function comprising a receiving and processing module configured to analyze the received signals, each unit providing the radar-jamming function being configured to generate and to transmit jamming signals, each unit being interlinked by at least one two-way data link and being synchronized by a common clock, said method comprising a step of identifying the signals received by the receivers and whether said received signals correspond to synthetic aperture radar signals:

a step of characterizing the received SAR signal over a predetermined duration that is shorter than the duration of a recurrence of the SAR signal;

a step of computing a filter adapted to the received SAR signal;

a step of carrying out pulse compression of the received SAR signal on each recurrence using said adapted filter;

a step of iteratively periodically characterizing the received signal over a predetermined duration that is longer than a recurrence of the SAR signal so as to establish, from one recurrence to the next, the speed of movement of the radar and the distance between said radar and the area to be protected;

a step of computing the jamming signals to be transmitted for each point of the area to be protected so as to jam the SAR radar coherently on the distance axis and on the Doppler axis, a step of transmitting the computed jamming signals.

According to one mode of implementation, the method comprises a step of time and frequency windowing so as to limit the detection volume of the processing module to a time window and to a bandwidth corresponding to the characteristics observed on the SAR signal.

According to one mode of implementation, a SAR signal is identified on the basis of predetermined criteria relating to its waveform and to the orientation of the antenna beam of the SAR radar.

According to one mode of implementation, at least one unit providing the radar-jamming function comprises a memory table in which various jamming signals are pre-recorded and wherein the jamming signals to be transmitted are not computed but loaded from the memory zone.

According to one mode of implementation, the area to be protected is modifiable.

Another subject of the invention is a device for jamming SAR-type airborne radars that is configured to implement the jamming method described above, said device comprising a group of at least two cooperating units surrounding an area on the ground to be protected, at least two units of said group providing a radar-detection function and at least one unit of said group providing a radar-jamming function, each unit providing the radar-detection function comprising a receiving and processing module configured to analyze the received signals, each unit providing the radar-jamming function being configured to generate and to transmit jamming signals, each unit being interlinked by a two-way data link and being synchronized by a common clock.

According to one embodiment, each unit provides the radar-jamming function.

According to one embodiment, the transmitter module of each unit providing the radar-jamming function comprises a movable antenna configured to stay pointed in the direction of the SAR radar to be jammed.

According to one embodiment, the receiver module of the units providing the radar-detection function comprises a superheterodyne-type receiver.

According to one embodiment, each unit providing the radar-detection function comprises an interferometry antenna.

According to one embodiment, at least one radar detector comprises a memory table in which various jamming signals are pre-recorded.

According to one embodiment, the synchronization clock is a GPS clock.

According to one embodiment, at least one data link is a secure data link.

According to one embodiment, at least one element of the group of at least two units is mobile.

BRIEF DESCRIPTION OF THE DRAWINGS

Other particularities and advantages of the present invention will become more clearly apparent upon reading the description which follows, given by way of non-limiting illustration and with reference to the appended drawings, in which.

DETAILED DESCRIPTION

The aim of the invention is to prevent a given site being observed correctly by an airborne radar of synthetic aperture (SAR) type. This may be achieved by masking the zone to be protected so as to prevent that which may characterize said zone being seen on the radar image or by transmitting false echoes so as to create false targets in the radar image.

To this end, the invention provides a method for jamming synthetic aperture radars configured to transmit a waveform that is coherent in terms of distance and in terms of Doppler for the integration time of the synthetic aperture radar. To achieve this, the invention is based on learning the waveform of the radar to be jammed, learning its angle of observation over time and predicting the trajectory of its carrier using means for detecting the radar signals so as to predict the phase history that the radar will have with respect to each point of the zone to be masked.

Figure 1A:
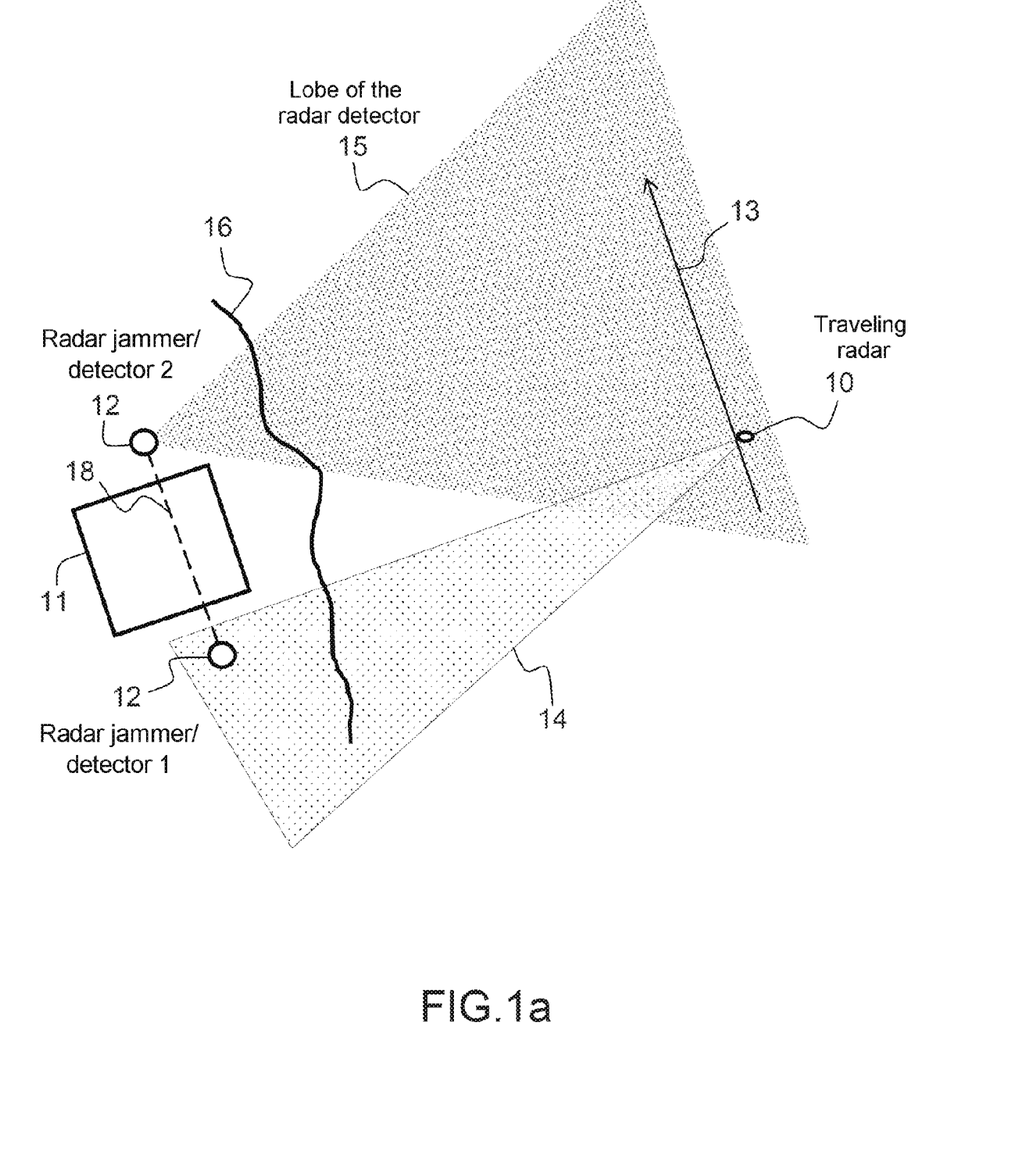
FIGS. 1a and 1b show an example of one embodiment of a radar-jamming device according to the invention.
Figure 1B:
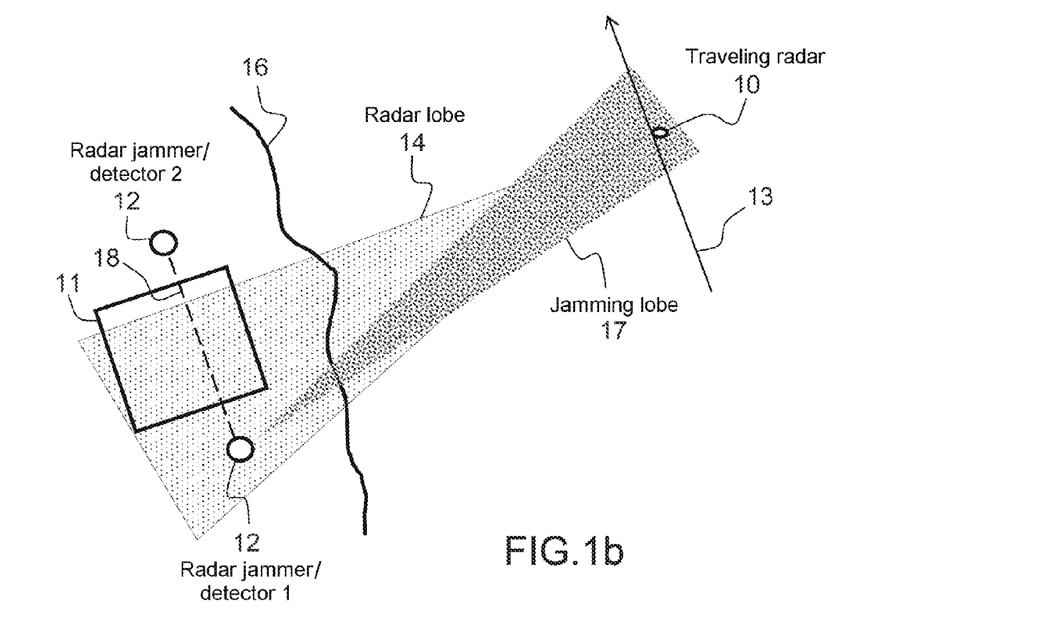

FIGS. 1a and 1b show an example of one embodiment of a device for jamming airborne radars 10 of synthetic aperture type for the purpose of protecting an area 11 on the ground corresponding to a zone to be protected. This zone to be protected may correspond, for example, to a sensitive civilian or military site. This area 11 to be protected may have fixed or variable dimensions. In the latter case, the area 11 to be protected is modified over the course of one and the same jamming sequence, by modifying the parameters of the various replicas.

The jamming device comprises at least two cooperating units 12 placed on either side of the area 11 to be protected, so as to surround it. The position of the units 12 may be chosen by accounting for the possible approach trajectories 13 of a carrier for the purpose of SAR-imaging this zone to be protected. For example, SAR-imaging a zone along a coast or close to a border 16 is generally achieved by traveling over a long distance on a trajectory 13 that is substantially parallel to this coast or to this border 16. Thus, if the area 11 to be protected is located along a coast or close to a border 16, the units 12 may be placed on either side of the zone to be protected such that they are aligned along a straight line that is substantially parallel to the coast or the border and therefore substantially parallel to the potential trajectory 13 of an airborne platform fitted with a SAR radar attempting to image the area 11 to be protected.

According to one embodiment, at least one unit 12 may be installed on mobile means such as for example a vehicle, to allow it to be moved according to the needs and the area to be protected.

At least two units 12 of the jamming device provide a high-sensitivity radar-detection function and at least one unit 12 of the jamming device provides a radar-jamming function. Preferably, each unit 12 of the jamming device provides the radar-detection function and the radar-jamming function. These units 12 are interlinked by one or more two-way data links 18 so as to allow data to be exchanged between these various units 12. At least one data link 18 may be a secure link and, preferably, all of the links are secure data links. The various units 12 are synchronized with one another, for example, by a GPS clock or any equivalent type of clock means.

Each unit providing the radar-detection function is fitted with a receiving and processing module allowing it to detect the presence of a synthetic aperture radar, to estimate the direction of arrival of the radar transmissions, ideally along two dimensions (azimuth and elevation), to identify the characteristics of the SAR signal over the short term, i.e. on the scale of one recurrence, and over the long term, i.e. over a series of recurrences. The units 12 providing the radar-detection function may be fitted with an antenna device having wide coverage in azimuth, typically of the order of 90°, and capable of being oriented, for example, mechanically.

The jamming device is configured to detect and to identify the characteristics of a SAR signal and to jam, coherently, the radar 10 attempting to image the zone to be protected before it comes into visible range of the area 11 to be protected, then for the entire time over which the radar is illuminating this area 11 to be protected. To achieve this, detection is performed jointly by units 12 providing the high-sensitivity radar-detection function, for example of superheterodyne type, which are centered in the frequency band used by airborne SAR radars, typically the X band. It is recalled that the X band is a range of radiowave frequencies located around 10 GHz. The radar-detection function may, for example, be provided by an instantaneous-band 500 MHz receiver, capable of sweeping a band of frequencies between around 8.5 GHz and around 10.5 GHz. The units 12 providing the radar-detection function are fitted with means for estimating the times of arrival (TOA) of the radar pulses and for estimating the directions of arrival (DOA) obtained typically by interferometry and having wide coverage in azimuth.

The units 12 providing the radar-detection function comprise at least one processing module configured to analyze the waveform of the radar transmissions intercepted by the receiver modules so as to identify, with a high level of accuracy, the intrapulse parameters of the SAR signal transmitted by the radar 10 on each recurrence. This signal is generally a linearly frequency-modulated signal, more commonly referred to as a "chirp". As mentioned above, the radar-detection functions are provided with synchronization and communication means allowing them to combine their detection information for the purpose of estimating, for example, the apparent distance of the SAR radar 10 on the basis of at least two estimates of the angle of arrival and of the time of arrival of the pulses, arising from at least two different radar detectors surrounding the area 11 to be protected. Similarly, the position, aiming angle and speed of movement of the radar may be estimated on the basis of the combined information from two units 12 providing the radar-detection function surrounding the area to be protected.

The one or more units 12 providing the radar-jamming function may comprise intrapulse analysis and recording means and at least one digital radiofrequency memory allowing them to reproduce the signal received from the radar by delaying it and dephasing it from one recurrence to the next according to the set of time and phase histories relating to the set of pixels constituting the corresponding SAR image.

According to one mode of implementation, the intrapulse analysis may be carried out by the one or more units 12 providing the radar-detection function having the lobe 15 of the antenna device that receives the highest power transmissions from the SAR radar 10 as it appears, i.e. that which is illuminated first by a lobe of the radar, according to the direction of arrival thereof.

Preferably, the detection and analysis of the waveform of the SAR radar 10 attempting to illuminate the zone to be protected is carried out in a side lobe of the radar 10. To achieve this, the one or more processing modules of the units 12 providing the radar-detection function have a margin of sensitivity that is sufficient for them to be able to detect a synthetic aperture radar 10 even when it illuminates the antenna device of said unit 12 on a side lobe 21. This makes it possible to anticipate and to implement jamming before the zone to be masked is illuminated by the main lobe 14 of the antenna of the radar 10, as illustrated in FIG. 1a, and for the entire duration over which the area 11 to be protected is illuminated by the main lobe 14.

The units 12 providing the radar-detection function must have an instantaneous analysis band that is sufficient to be able to measure the intrapulse modulations. This requires a sufficient signal-to-noise ratio and sufficient antenna gain. Advantageously, a superheterodyne receiver allows this type of processing by decreasing the instantaneous analysis band as needed and by providing a high level of rejection of out-of-band signals.

Figure 2:
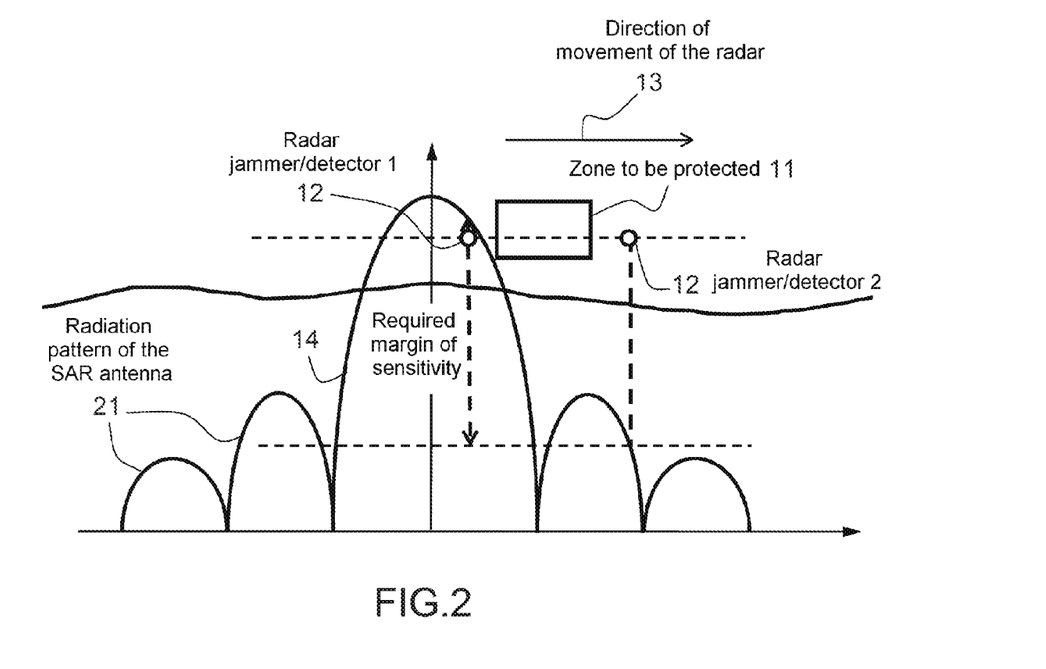
FIG. 2 shows an example of a radiation pattern of a SAR radar antenna.

The units 12 providing the radar-detection function may be chosen so that their detection sensitivity is sufficient to be able to detect a synthetic aperture radar on a side lobe 21 of its antenna. By way of illustration, FIG. 2 shows an example of a radiation pattern of the antenna of a synthetic aperture radar. Considering that the first side lobe 21 is generally located at a level that is 20 to 25 dB lower with respect to the main lobe 14, the sensitivity may be chosen for example so that it is 25 dB higher than the minimum sensitivity required to detect the main lobe of the antenna of a SAR radar. This level of sensitivity may be obtained using techniques known to a person skilled in the art, for example by using superheterodyne receivers with spectral analysis.

Figure 3:
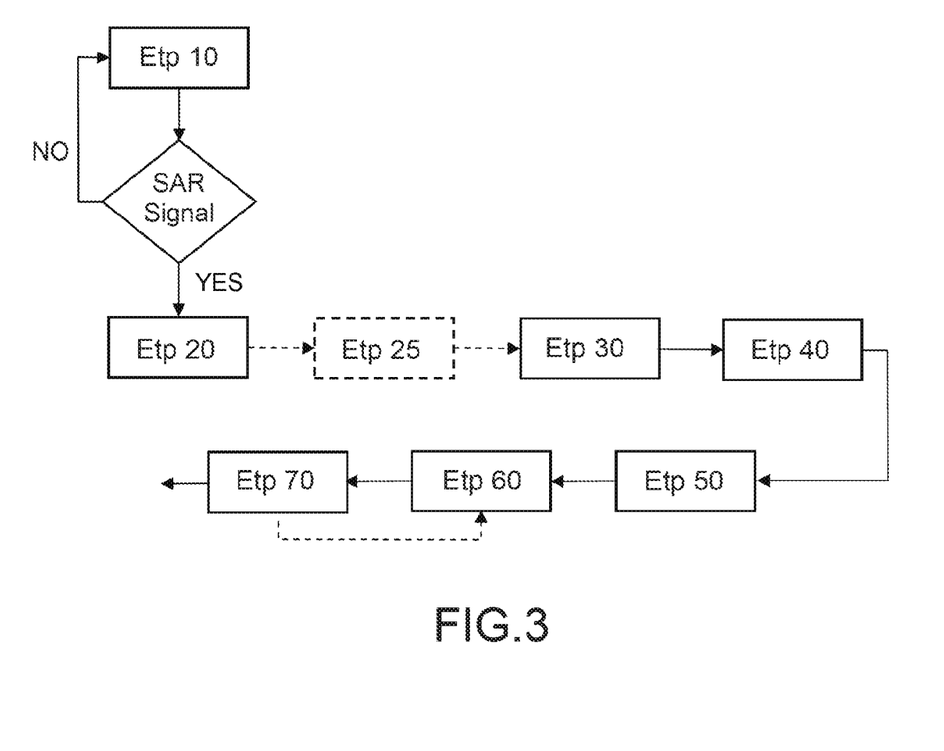
FIG. 3 shows possible steps of the jamming method according to the invention.

FIG. 3 illustrates possible steps of the jamming method according to the invention.

In a step Etp10, the signals received by the antenna devices of the receiver modules of the units 12 providing the radar-detection function are analyzed so as to identify them and to detect the presence of radar signals. This detection and the identification of the presence of a SAR radar 10 are carried out on the basis of predetermined criteria relating to the waveform of the SAR signal and to the illumination distribution of the radar 10. These criteria correspond to that typically produced by a synthetic aperture radar 10. For example, an alert warning of the presence of such a radar could be generated if the following criteria are met:

Presence of a pulsed signal in the search band of the processing module of the unit 12 providing the radar-detection function;

Presence of a signal exhibiting a constant period of recurrence or a periodic modulation of the period of recurrence;

Presence of a signal exhibiting a constant frequency from one pulse to the next, or a periodic modulation of the frequency from one pulse to the next;

Presence of a signal exhibiting a constant pulse duration from one pulse to the next;

Presence of a signal exhibiting a wide intrapulse bandwidth, typically wider than 50 MHz;

Presence of a signal corresponding to a pointed radar, i.e. without amplitude modulation of the received signal linked to the rotation of the radar antenna;

Presence of a signal exhibiting a constant phase from one pulse to the next (which is the most common) or a periodic modulation of the phase from one pulse to the next (which is a possible electronic counter-countermeasure technique or technique for dealing with distance ambiguities) (In the latter case, the intentional modulation law for the phase will be characterized on the basis of the received signal, by separating the fast modulations linked to intentional modulation from the slow modulations linked to the SAR effect.)

The purpose of checking the presence of all of these parameters is to avoid activating a jammer because of a false alarm.

According to one mode of implementation of the invention, the units 12 providing the radar-detection function may also detect the presence of a signal exhibiting an identical intrapulse modulation from one pulse to the next (which is the most common) or a periodic modulation of the pulse modulation from one pulse to the next (which is a possible electronic counter-countermeasure technique or technique for dealing with distance ambiguities).

When the presence of a SAR radar has been detected, the processing module of the units 12 providing the radar-detection function determines, in a step Etp20, the characteristics of the signal transmitted by the synthetic aperture radar over the short term. The short term refers here to a time shorter than the duration of one radar recurrence. The analysis of the SAR signal is carried out on a cycle having a predetermined duration that is shorter than the duration of one recurrence of the SAR signal making it possible to accurately identify the waveform transmitted by the radar 10 within each recurrence, and making it possible to predict, from one recurrence to the next, whether or not this waveform is constant. Typically, the duration of analysis is of the order of several tens of milliseconds to hundreds of milliseconds. This analysis makes it possible to identify, in particular, the transmission frequency or carrier frequency, the pulse duration, the recurrence duration, the intrapulse modulation and the corresponding modulation band $\Delta F$, the transmission pulse starting phase and the direction of arrival of the radar signal.

The modulation band $\Delta F$ of the radar makes it possible to estimate the radial distance resolution of the SAR radar, i.e. the size of one elementary pixel in the radar image. This resolution is given by the formula:

$$\Delta R_d = \frac{c}{2\Delta F}$$

in which: $\Delta R_d$ represents the radial distance resolution of the radar;

c represents the speed of propagation of the waves;

$\Delta F$ represents the modulation band.

Conventionally, the transverse resolution $\Delta R_a$ is taken to be equal to the radial resolution $\Delta R_d$.

According to one mode of implementation, the jamming method may comprise a step Etp25 of time and frequency windowing so as to limit the detection volume of the processing module to a time listening window and to a bandwidth corresponding to the characteristics observed on the SAR signal. To achieve this, the information on the SAR signal may be used for example by the processing modules of the radar-detection function to synchronize the listening window of the receiver of each unit 12 providing the radar-detection function with the pulse transmitted by the radar 10 on each recurrence. This makes it possible to simplify processing and not to disturb the receivers with signals other than those transmitted by the radar. Similarly, the characteristics of the SAR signal estimated over the short term may be used to choose the reception band best suited to this signal.

Figure 4:
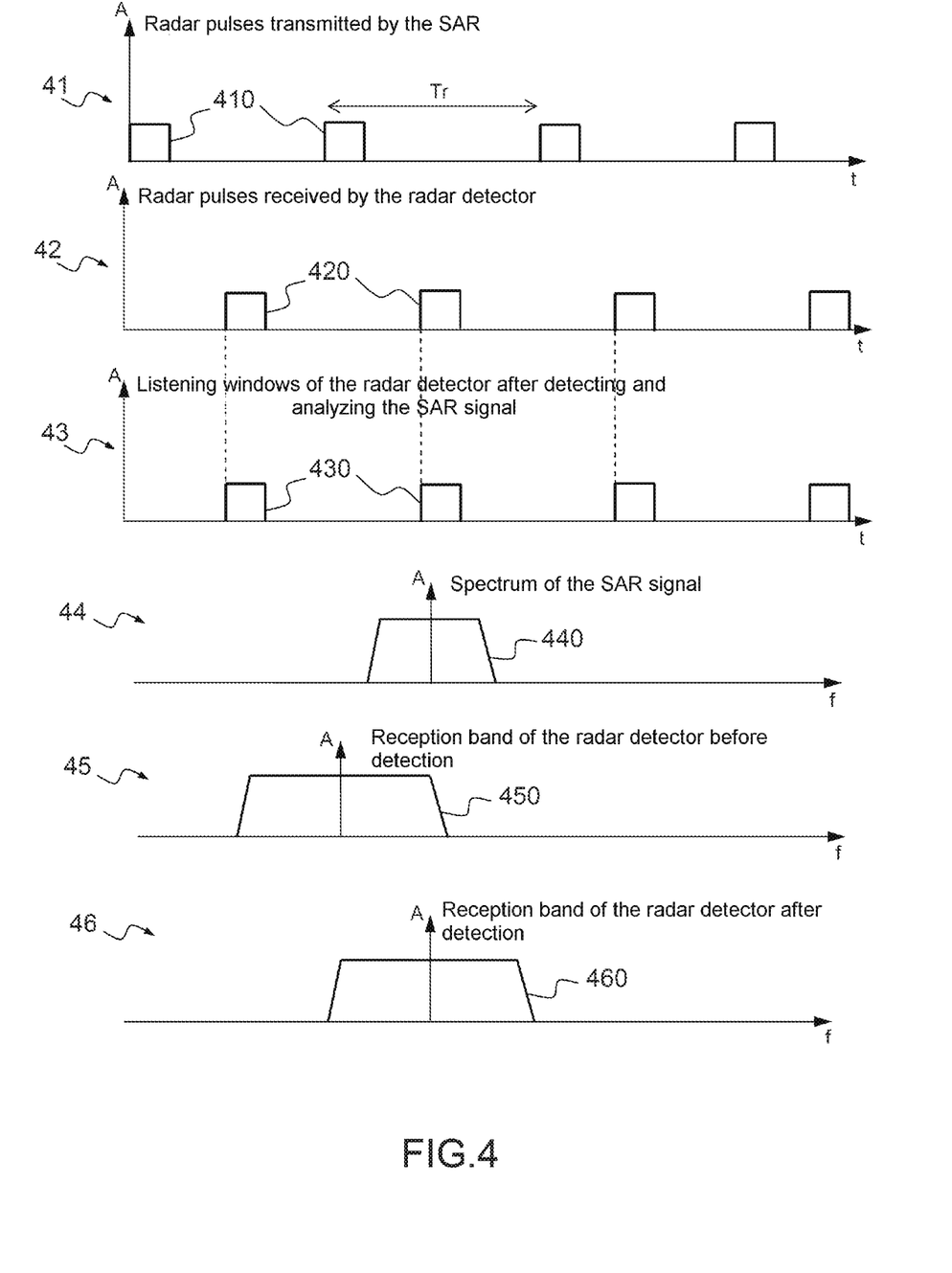
FIG. 4 shows examples of time and frequency listening windows with respect to the radar signal.

By way of illustration, FIG. 4 makes it possible to compare examples of time and frequency listening windows with the variation over time and the spectrum of the corresponding signal transmitted by the radar and received by a radar detector. Graphs 41 and 42 respectively show the amplitudes of the pulses 410 of the signal transmitted by the radar and those 420 of the signal received by a radar detector. Graph 43 shows the time listening windows 430 of the receiver of the radar detector. These listening windows are periodic and synchronized with the signal received by the receiver. The time window 430 is synchronized with the pulse 420 received from the radar subsequent to the prior reception of multiple successive pulses 420.

Graph 44 shows the amplitude of the spectrum of the SAR signal transmitted by the radar. Graphs 45 and 46 respectively show the reception bands 450 and 460 of the radar detector before and after detection. After detection, the reception band or frequency listening window 460 of the radar detector is tuned to the single frequency band of the SAR signal.

On the basis of the characteristics of the observed waveform, a step Etp30 is implemented in which the processing modules of the units 12 providing the radar-detection function compute a correlator adapted to the detected SAR signal, i.e. a filter adapted to the radar pulse making it possible to compress the pulse received at the radar detector.

This short-term correlator is next used, in a step Etp40, to compress the pulse received at the antenna device of the radar-detection function on each radar recurrence. Pulse compression is here used to improve the signal-to-noise ratio of the received signal. The detection of the compressed pulses makes it possible to obtain the phase in the distance boxes $\Delta R_d$ and thereby to learn, over the long term, the Doppler history linked to the movement of the radar carrier with respect to the unit 12 providing the radar-detection function and to extract the Doppler phase $\varphi_{dr}(t)$ and its history. This compressed pulse will make it possible to implement a step Etp50 of iteratively periodically characterizing the received signal over the long term, i.e. over a duration that is longer than the duration of one recurrence of the SAR signal, so as to establish, from one recurrence to the next, the speed of movement of the radar and the distance between said radar and the area to be protected.

Once the waveform of the radar has been analyzed, at least one jamming generation module estimates the waveform of the jamming signals to be transmitted by the jamming transmitter module in a step Etp60.

Figure 5:
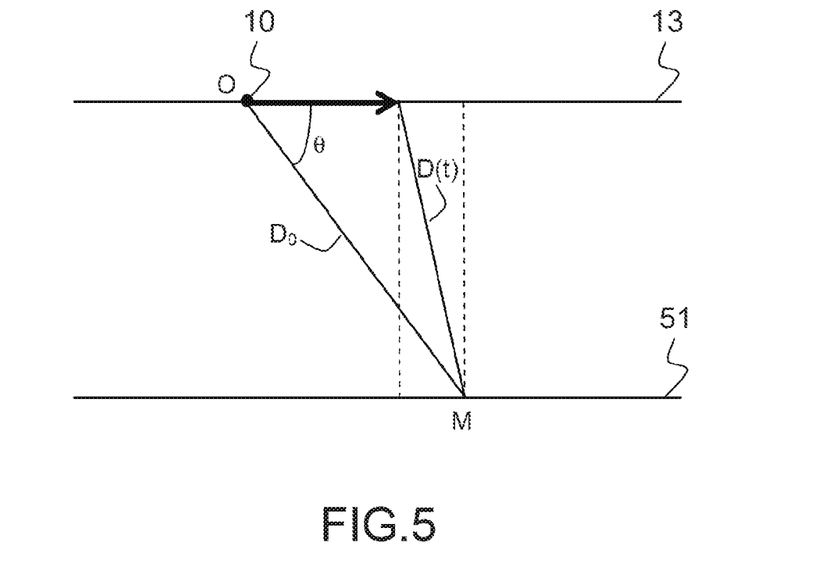
FIG. 5 illustrates the SAR equation.

With reference to FIG. 5, a radar 10 SAR located at a point O at t=0 and a point M on the ground 51 located at time t=0 at a distance Do and at an angle $\Theta$ with respect to the axis of movement 13 of the SAR radar carrier moving at a speed V is considered. If the conventional SAR equation defining the distance history D(t) between the SAR radar 10 and the point M on the ground 51 is considered, the following relationship holds:

$$D(t) = D_0 \sqrt{1 - \frac{2V \cdot t \cdot \cos(\theta)}{D_0} + \frac{V^2 \cdot t^2}{D_0^2}}$$

Using a second-order finite expansion of (V.t), it is possible to extract:

$$D(t) = D_0 - V \cdot t \cdot \cos(\theta) + \frac{V^2 \cdot t^2}{2D_0} \sin^2(\theta) \qquad (1)$$

and consequently, the outbound-inbound phase $\varphi_r(t)$ on each radar recurrence:

$$\varphi_r(t) = 4\pi \frac{D_0}{\lambda} - 4\pi \frac{V}{\lambda} \cos(\theta) t + 4\pi \frac{V^2}{2\lambda D_0} \sin^2(\theta) t^2 \qquad (2)$$

The Doppler frequency $Fd_r$ for the direction $\Theta$, seen from the SAR radar is:

$$Fd_r(t) = \frac{2V}{\lambda}\cos(\theta) - \frac{2V^2}{\lambda \cdot D_0}\sin^2(\theta)t \quad (3)$$

In which $\lambda$ represents the wavelength.

The band $B_d$ imaged over the illumination time $T_e$ of the antenna of the radar 10 is given by the relationship:

$$Bd = \frac{2V^2}{\lambda \cdot D_0}\sin^2(\theta)Te \quad (4)$$

and the transverse resolution $\Delta Ra$ obtained by the SAR radar:

$$\Delta R_a = \frac{\lambda \cdot D_0}{2V \cdot T_e \cdot \sin(\theta)} \quad (5)$$

On the basis of L, the equivalent length of the SAR antenna and relationships (4) and (5), the number $N_{dop}$ of replicas to be generated in each distance box to cover the entire Doppler band is deduced:

$$N_{dop} = \frac{\lambda D_0}{L \cdot \Delta R_a} = \frac{2V \cdot T_e \cdot \sin(\theta)}{L} \quad (6)$$

Seen from the radar detector, the Doppler phase corresponding to a single path is written at a time t as:

$$\varphi_{dr}(t) = 2\pi \frac{D_0}{\lambda} - 2\pi \frac{V}{\lambda}\cos(\theta)t + 2\pi \frac{V^2}{2\lambda D_0}\sin^2(\theta)t^2 \quad (7)$$

It should be noted that this is true only if the radar pulses are transmitted at constant phase on each recurrence, which corresponds to the majority of cases. Otherwise, it would additionally be necessary to learn the modulation law to subtract it from the measurement.

The Doppler frequency corresponding to a single path is written at time t as:

$$Fd_{dr}(t) = \frac{V}{\lambda}\cos(\theta) - \frac{V^2}{\lambda D_0}\sin^2(\theta)t \quad (8)$$

This relationship may be written in a conventional form corresponding to a linearly frequency-modulated signal:

$$Fd_{dr}(t) = Fd_{0esm} - \frac{B_d}{2T_e}t \quad (9)$$

The signal intercepted by the antenna device of the radar-detection function may be written in baseband, i.e. after demodulation by the carrier frequency f:

$$r_{dr}(\tau, t) = a(t)Rec_T\left(\tau - \frac{D(t)}{c}\right)e^{-2\pi jf\frac{D(t)}{c}}e^{+2\pi j\left(\frac{\Delta F}{2T}\left(\tau - \frac{D(t)}{c}\right)^2\right)} \quad (10)$$

Where: $\tau$ represents the short term, i.e. the time in a recurrence, the time origin being taken at the start of a recurrence;

t represents the long term, i.e. a time that is a multiple of the duration of one recurrence: t=k.Tr;

$\Delta F$ represents the modulation band of the radar signal;

T represents the pulse duration of the radar;

a(t) represents the amplitude of the received signal over the long term t;

c represents the speed of propagation of the waves.

By applying the previously estimated "short-term" correlator, the processing module of the unit 12 providing the radar-detection function compresses the signal received on each recurrence of index i, so as to extract therefrom, on each recurrence, a compressed signal $r_{cdr}(t)$ according to the propagation delay D(t)/c of the form:

$$r_{cdr}\left(\frac{D(t)}{c}, t\right) =$$
$$a(t)e^{-2\pi jf\frac{D(t)}{c}}\int_{-\infty}^{+\infty}Rec_T\left(\tau - \frac{D(t)}{c}\right)e^{+2\pi j\left(\frac{\Delta F}{2T}\left(\tau - \frac{D(t)}{c}\right)^2\right)}Rec_T(\tau)e^{-2\pi j\frac{\Delta F}{2T}\tau^2}d\tau$$

$$r_{cdr}\left(\frac{D(t)}{c}, t\right) = a(t)e^{-2\pi jf\frac{D(t)}{c}}e^{j\pi\frac{\Delta FD^2(t)}{Tc^2}}$$
$$\int_{-\infty}^{+\infty}Rec_T\left(\tau - \frac{D(t)}{c}\right)Rec_T(\tau)e^{\frac{-2\pi j\Delta FD(t)\tau}{cT}}d\tau$$

After computing this yields:

$$r_{cdr}\left(\frac{D(t)}{c}, t\right) =$$
$$a(t)e^{-2\pi jf\frac{D(t)}{Cc}}e^{2\pi j\frac{\Delta FD^2(t)}{Tc^2}}Rec_{2T}(\tau)\left(T - \left|\frac{D(t)}{c}\right|\right)\frac{\sin\left(\frac{\pi \Delta FD(t)}{cT}\left(T - \left|\frac{D(t)}{c}\right|\right)\right)}{\frac{\pi \Delta FD(t)}{cT}\left(T - \left|\frac{D(t)}{c}\right|\right)}$$

If the quadratic phase term in $D^2(t)$ is neglected, the following is obtained:

$$r_{cdr}\left(\frac{D(t)}{c}, t\right) \approx \quad (11)$$
$$a(t)e^{-2\pi jf\frac{D(t)}{c}}Rec_{2T}(\tau)\left(T - \left|\frac{D(t)}{c}\right|\right)\frac{\sin\left(\frac{\pi \Delta FD(t)}{cT}\left(T - \left|\frac{D(t)}{c}\right|\right)\right)}{\frac{\pi \Delta FD(t)}{cT}\left(T - \left|\frac{D(t)}{c}\right|\right)}$$

The phase relating to the SAR effect appears in the term $$e^{-2\pi if\frac{D(t)}{c}}$$

with, according to (7):

$$\varphi_{dr}(t) = 2\pi f\frac{D(t)}{c} = 2\pi\frac{D_0}{c} - 2\pi\frac{V}{\lambda}\cos(\theta)t + 2\pi\frac{V^2}{2\lambda D_0}\sin^2(\theta)t^2$$

Estimating the SAR signal over the long term consists in identifying, in a correlator, the initial Doppler frequency $Fd_{odr}$ using the relationship:

$$Fd_{o_{dr}} = \frac{V}{\lambda}\cos(\theta)$$

and the modulation slope $$\frac{Bd}{2Te}$$

of the frequency-modulated signal over the long term corresponding to the SAR effect by virtue of the relationship:

$$\frac{Bd}{2Te} = \frac{V^2}{\lambda D_0}\sin^2(\theta).$$

This analysis is carried out over a duration that is much shorter than the illumination time Te of the synthetic aperture radar, for example over 100 ms, and recursively refreshed over time by considering, on each iteration, a new time origin for the long term. Given the short duration used to carry out the correlation, it may be assumed that there is no migration in terms of distance and that the amplitude of the compressed signal may be considered to be constant over this time, thus:

$$r_{cdr}\left(\frac{D(t)}{c}, t\right) \approx Ka(t)e^{-2\pi jf\frac{D(t)}{c}} \quad (12)$$

$$r_{cdr}\left(\frac{D(t)}{c}, t\right) \approx Ka(t)e^{-2\pi j\left(\frac{D_0}{\lambda} - \frac{V}{\lambda}\cos(\theta)t + \frac{V^2}{2\lambda D_0}\sin^2(\theta)t^2\right)}$$

The correlation may be carried out using a time-frequency transform, such as the Wigner-Ville transform for example.

In practice, given the short analysis time and the gentle modulation slope, the Doppler frequency may in general be considered to be constant over the analysis, and a simple Fourier transform making it possible to measure the mean Doppler frequency $Fd_{dr}$ over the duration of the analysis may be enough to characterize the SAR signal.

$$Fd_{dr} = \frac{V}{\lambda}\cos(\theta) + \frac{V^2}{2\lambda D_0}\sin^2(\theta)t \approx \frac{V}{\lambda}\cos(\theta)Fd_{0_{dr}}$$

This is equivalent to unfocused synthetic antenna processing.

Measuring the mean Doppler frequency $Fd_{dr}$ further makes it possible, having estimated the wavelength $\lambda$ and the angle of direction of arrival $\Theta$ with respect to the radar detector, to deduce the speed V of the carrier therefrom. The distance $D_0$ is obtained by combining the detections of the two radar detectors, for example by using the difference in the angles of arrival or the difference in the times of arrival of the pulses. On the basis of equation (5), the following is obtained:

$$\Delta R_a = \frac{\lambda D_0}{2VT_e\sin(\theta)}$$

It is thus possible to deduce the SAR integration time $T_e$ therefrom and consequently, using relationship (4), the extension of the Doppler band Bd to be jammed:

$$Bd = \frac{2V^2}{\lambda D_0}\sin^2(\theta)Te$$

According to equation (10), the signal $r_{dr}(\tau,t)$ intercepted by the radar detector may be written in baseband, i.e. after demodulation by the carrier frequency f, in the form:

$$r_{dr}(\tau, t) = a(t)\,Rec_T\left(\tau - \frac{D(t)}{c}\right)\underbrace{e^{-2\pi jf\frac{D(t)}{c}}}_{\text{Long-term term}}\underbrace{e^{+2\pi j\left(\frac{\Delta F}{2T}\right)\left(\tau - \frac{D(t)}{c}\right)^2}}_{\text{Short-term term}}$$

Let $\Delta R_d$ be the radial resolution of the radar, $\Delta R_a$ its transverse resolution and D(t) the current distance from the jammer used to the radar. If a given point M' of the area to be protected is considered, offset with respect to the jammer used by a radial distance $x_i=i\Delta R_d$, where i is an integer, and by a transverse distance $y_j=j\Delta R_a$, where j is an integer, it is possible to calculate that the distance $D_{i,j}(t)$ from this point to the radar is such that:

$$D_{i,j}(t) = \sqrt{D(t)^2 + (x_i^2 + y_j^2) - 2(x_i x_R + y_j y_R)}$$

where $x_R$ and $y_R$ are respectively the projections of D(t) on the radial axis and on the transverse axis.

The jamming signal $r_{bi,j}(\tau,t)$ to be generated by the jammer to mask this point M' at the time defined by the pair $(t,\tau)$, in which $t=kTr+\tau$, (k representing an integer, Tr the time of recurrence and $\tau$ the short term) is consequently given, in baseband, by the relationship:

$$r_{dr}(\tau, t) = a(t)Rec_T\left(\tau - \frac{D(t) + 2(D_{i,j}(t) - D(t))}{c}\right)$$
$$e^{-2\pi jf\frac{D(t)+2(D_{i,j}(t)-D(t))}{c}}e^{+2\pi j\left(\frac{\Delta F}{2T}\right)\left(\tau - \frac{D(t)+2(D_{i,j}(t)-D(t))}{c}\right)^2}$$

in which $a_{i,j}$ is the desired jamming amplitude.

Assuming:

$$r_{bi,j}(\tau, t) = a_{i,j}(t)Rec_T\left(\tau - \frac{D(t) + 2(D_{i,j}(t) - D(t))}{c}\right) \quad (14)$$
$$e^{-2\pi jf\frac{D(t)+2(D_{i,j}(t)-D(t))}{c}}e^{+2\pi j\left(\frac{\Delta F}{2T}\right)\left(\tau - \frac{D(t)+2(D_{i,j}(t)-D(t))}{c}\right)^2}$$

$$r_{b,i,j}(\tau, t) = \frac{a_{i,j}(t)}{a(t)}r_{esm}(\tau - \Delta\tau_{i,j}(t), t)e^{-2\pi jf\Delta\tau_{i,j}(t)} \quad (15)$$

At short time $\tau$ of the recurrence t, the frequency of the linearly frequency-modulated signal, or "chirp", is:

$$f_\tau = \frac{\Delta F}{T}\tau.$$

By expressing the Fourier transform over the short term and by letting $S_{dr}(f_\tau,t)$ denote the Fourier transform of the signal intercepted by the radar detector $r_{dr}(\tau,t)$ and $S_{bi,j}(f_\tau,t)$ the Fourier transform of the jamming signal $r_{b,i,j}(\tau,t)$, the following is obtained:

$$S_{bi,j}(f_\tau, t) = \frac{a_{i,j}(t)}{a(t)} S_{dr}(f_\tau, t) e^{-2\pi i f_\tau \Delta \tau_{i,j}(t)} e^{-2\pi i f \Delta \tau_{i,j}(t)}$$

In the Fourier domain, the jamming signal to be transmitted to cover the entire image in $N_{dist}$ distance boxes and $N_{dop}$ Doppler boxes is written, at time t, as:

$$SB(f_\tau, t) = \sum_{i=1}^{N_{dist}} \sum_{j=1}^{N_{dop}} S_{bi,j}(f_\tau, t) \quad (16)$$

$$SB(f_\tau, t) =$$

$$\sum_{i=1}^{N_{dist}} \sum_{j=1}^{N_{dop}} \frac{a_{i,j}(t)}{a(t)} S_{dr}(f_\tau, t) e^{-2\pi i f_\tau \Delta \tau_{i,j}(t)} e^{-2\pi i f \Delta \tau_{i,j}(t)}$$

According to one alternative mode of implementation of the jamming method, at least one unit 12 providing the radar-jamming function comprises a memory table or modulation table in which various jamming signals corresponding to the various possible trajectories of the carrier of the SAR radar 10 to be jammed are pre-recorded. According to the characteristics of the received radar signal, this memory zone is addressed to command the generation of the jamming signals to be transmitted. The form of the jamming signals to be transmitted is therefore not computed in real time but chosen from precomputed and pre-recorded forms in a memory zone. Advantageously, computing the jamming replicas out of real time allows the computing means to be used and the processing time to be considerably decreased.

Once the jamming signals have been computed, the signals are next transmitted by the transmitter module of the one or more units 12 providing the radar-jamming function in a step Etp70. Depending on the results of the one or more processing modules of the units 12 providing the radar-detection function and depending on the direction of travel of the synthetic aperture radar 10, the unit 12 providing the radar-jamming function which is angularly closest to said radar 10 will be activated. This jamming is performed by pointing the main lobe 17 of the jamming transmission antenna in the direction of the radar 10 before this radar is in a position to illuminate the zone to be protected, and for the entire time over which it is illuminating it, as illustrated in FIG. 1*b*. To achieve this, the units 12 providing the jamming function may be fitted with a directional antenna, typically having a few degrees of aperture. This antenna may for example be kept pointed in the direction of the synthetic aperture radar to be jammed by means of mechanical servocontrol.

The operation of estimating the replicas to be transmitted may be repeated periodically so as to continuously optimize the effectiveness of the jamming.

Figure 6:
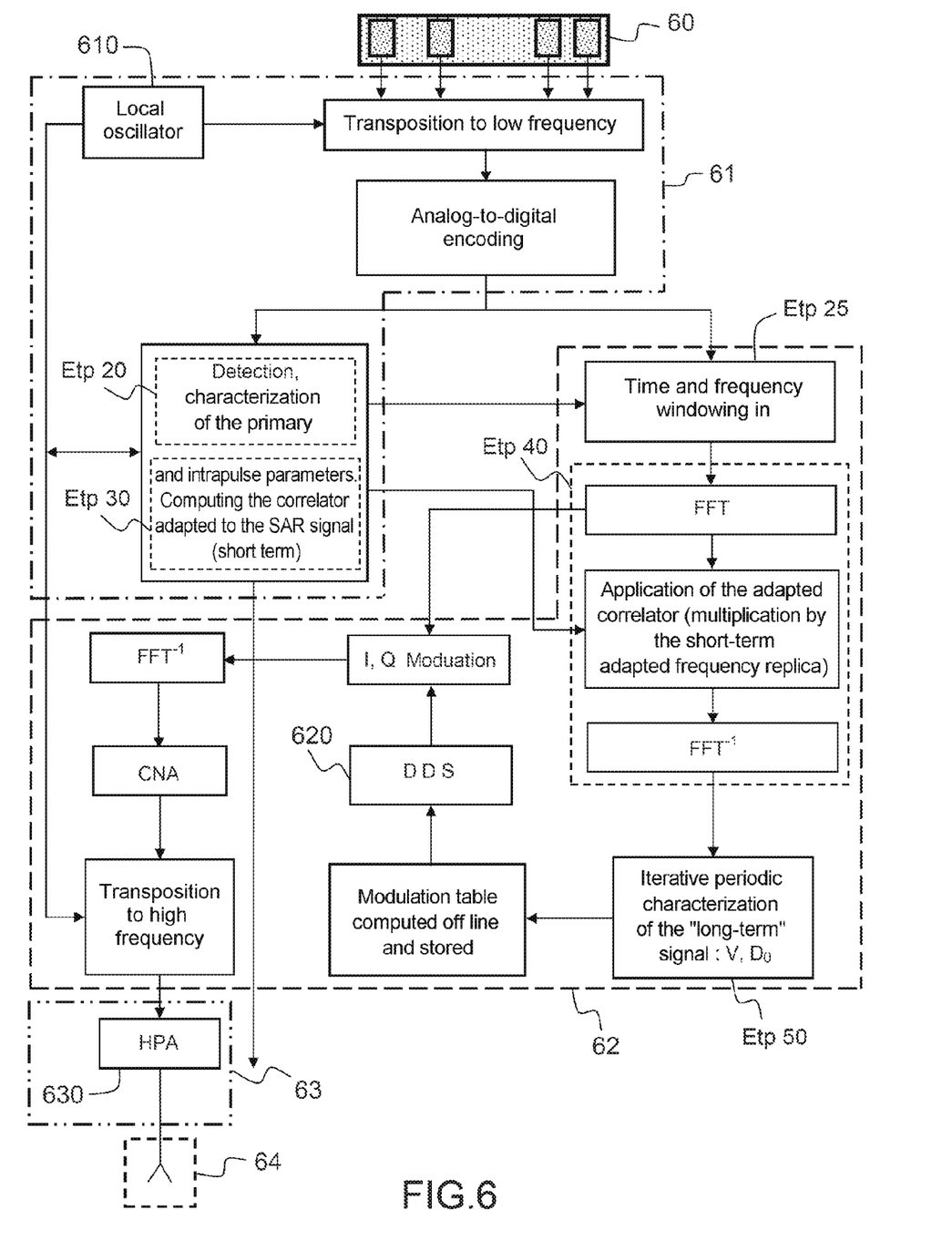
FIG. 6 shows an example of one implementation of the invention.

FIG. 6 illustrates an example of one implementation of the invention. In this preferred embodiment, each unit 12 provides the radar-detection and radar-jamming functions and is configured to operate in the X band. Each unit 12 comprises a receiving and processing module 61 that is configured to analyze the signals received by the antenna device 60 of the radar-detection function. Each unit 12 also comprises a jamming generation module 62 configured to generate the jamming signals to be transmitted by the jamming transmission module 63 and the jamming transmission antenna 64.

The receivers of the radar-detection functions are of interferometry superheterodyne type and the jamming generation modules 62 use digital radiofrequency memory (DRFM) systems. The units 12 are fitted with an antenna device 60 for wide-field interferometry, typically of the order of 90°, which can be oriented mechanically. The units are synchronized by a GPS clock and communicate via at least one secure two-way data link 18.

In this preferred embodiment, the radar transmissions received on the antenna device 60 of the radar-detection function are transposed to a lower frequency using a local oscillator 610 so as to facilitate their processing then digitized by means of an analog-to-digital converter.

The detection of the primary features of the pulse is next carried out. On the basis of these characteristics, the correlator which will be adapted to the SAR signal on each recurrence is computed.

On the basis of the received signals, time and frequency windowing for reception is also set up so as to limit the detection volume and remove those signals outside the useful interval corresponding to the characteristics observed on the radar signal.

The received signals next undergo short-term pulse compression. For this, a transformation for transitioning from the time domain to the frequency domain is first applied via a fast Fourier transform. The resulting signal is then processed by an adapted correlator and the signal thus obtained is next again transformed so as to transition from the frequency domain to the time domain via an inverse Fourier transform. Lastly, a compressed pulse is obtained which will be used to establish, from one recurrence to the next, the speed of movement of the carrier and the distance between this carrier and the area to be protected. These parameters will allow the modulation table to be addressed so as to command the digital generation of the phase samples corresponding to the jamming signals by a digital signal synthesizer (direct digital synthesizer, DDS) 620.

The phase samples arising from the digital signal synthesizer are used to modulate the received signal which was previously transposed to lower frequencies and transformed from the time domain to the frequency domain. The resulting signal is next transformed to the time domain, using an inverse Fourier transform function, then converted to analog using a digital-to-analog converter. The signal is next transposed to a higher frequency so as to return it to the frequency of the radar, on its original carrier frequency. Lastly, the signal is amplified by a high-power amplifier (HPA) 630 before being transmitted by the jamming transmission antenna 64.

The various receiving, processing, jamming generation and transmission modules may comprise one or more microprocessors, processors, computers or any other equivalent appropriately programmed means.

The invention claimed is:

1. A method for jamming at least one SAR-type airborne radar implemented by a radar-jamming device comprising a group of at least two cooperating units surrounding an area on the ground to be protected, at least two units of said group providing a radar-detection function and at least one unit of said group providing a radar-jamming function, each unit providing the radar-detection function comprising a receiving and processing module configured to analyze the received signals, each unit providing the radar-jamming function being configured to generate and to transmit jamming signals, each unit being interlinked by at least one two-way data link and being synchronized by a common clock, said method being wherein it comprises a step (Etp10) of identifying the signals received by the receivers and whether said received signals correspond to synthetic aperture radar signals:

a step (Etp20) of characterizing the received SAR signal over a predetermined duration that is shorter than the duration of a recurrence of the SAR signal;

a step (Etp30) of computing a filter adapted to the pulses of the received SAR signal;

a step (Etp40) of carrying out pulse compression of the received SAR signal on each recurrence using said adapted filter, making it possible to obtain the phase in the distance boxes, thereby making it possible to obtain the Doppler history linked to the movement of the radar carrier;

a step (Etp50) of iteratively periodically characterizing the received signal over a predetermined duration that is longer than a recurrence of the SAR signal so as to establish, from one recurrence to the next, the speed of movement of the radar and the distance between said radar and the area to be protected;

a step (Etp60) of computing the jamming signals to be transmitted for each point of the area to be protected so as to jam the SAR radar coherently on the distance axis and on the Doppler axis;

a step (Etp70) of transmitting the computed jamming signals.

2. The method as claimed in claim 1, wherein the method comprises a step (Etp25) of time and frequency windowing so as to limit the detection volume of the processing module to a time window and to a bandwidth corresponding to the characteristics observed on the SAR signal.

3. The method as claimed in claim 1, wherein a SAR signal is identified on the basis of predetermined criteria relating to its waveform and to the orientation of the antenna beam of the SAR radar.

4. The method as claimed in claim 1, wherein at least one unit providing the radar-jamming function comprises a memory table in which various jamming signals are pre-recorded and wherein the jamming signals to be transmitted are not computed but loaded from the memory zone.

5. The method as claimed in claim 1, wherein the parameters of the jamming signals are modified over the course of one and the same jamming sequence so as to modify the area to be protected.

6. A device for jamming SAR-type airborne radars that is configured to implement the jamming method as claimed in claim 1, said device being wherein it comprises a group of at least two cooperating units surrounding an area on the ground to be protected, at least two units of said group providing a radar-detection function and at least one unit of said group providing a radar-jamming function, each unit providing the radar-detection function comprising a receiving and processing module configured to analyze the received signals, each unit providing the radar-jamming function being configured to generate and to transmit jamming signals, each unit being interlinked by a two-way data link and being synchronized by a common clock.

7. The device as claimed in claim 1, wherein each unit provides the radar-jamming function.

8. The device as claimed in claim 6, wherein the transmitter module of each unit providing the radar-jamming function comprises a movable antenna configured to stay pointed in the direction of the SAR radar to be jammed.

9. The device as claimed in claim 6, wherein the receiver module of the units providing the radar-detection function comprises a superheterodyne-type receiver.

10. The device as claimed in claim 6, wherein each unit providing the radar-detection function comprises an interferometry antenna.

11. The device as claimed in claim 6, wherein at least one radar detector comprises a memory table in which various jamming signals are pre-recorded.

12. The device as claimed in claim 6, wherein the synchronization clock is a GPS clock.

13. The device as claimed in claim 6, wherein at least one data link is a secure data link.

14. The device as claimed in claim 6, wherein at least one element of the group of at least two units is mobile.

* * * * *